United States Patent
Lee

(10) Patent No.: US 9,008,245 B1
(45) Date of Patent: *Apr. 14, 2015

(54) OPTIMAL SYMBOL DETECTION IN THE PRESENCE OF NON-GAUSSIAN INTERFERENCE

(71) Applicant: Marvell International Ltd., Hamilton (BM)

(72) Inventor: Jungwon Lee, San Diego, CA (US)

(73) Assignee: Marvell International Ltd., Hamilton (BM)

( * ) Notice: Subject to any disclaimer, the term of this patent is extended or adjusted under 35 U.S.C. 154(b) by 70 days.

This patent is subject to a terminal disclaimer.

(21) Appl. No.: 13/712,701

(22) Filed: Dec. 12, 2012

Related U.S. Application Data

(63) Continuation of application No. 12/823,898, filed on Jun. 25, 2010, now Pat. No. 8,340,231.

(60) Provisional application No. 61/223,986, filed on Jul. 8, 2009.

(51) Int. Cl.
- *H03D 1/04* (2006.01)
- *H03D 1/06* (2006.01)
- *H03K 5/01* (2006.01)
- *H03K 6/04* (2006.01)
- *H04B 1/10* (2006.01)
- *H04L 1/00* (2006.01)
- *H04L 25/08* (2006.01)

(52) U.S. Cl.
CPC ........................................ *H04B 1/10* (2013.01)

(58) Field of Classification Search
USPC ................. 375/346, 349, 341, 329, 262, 279; 455/63.1, 501
See application file for complete search history.

(56) References Cited

U.S. PATENT DOCUMENTS

| | | | |
|---|---|---|---|
| 6,714,609 B1 * | 3/2004 | Keisala | 375/349 |
| 8,279,980 B1 | 10/2012 | Lee et al. | |
| 8,340,231 B1 * | 12/2012 | Lee | 375/346 |
| 2006/0068709 A1 * | 3/2006 | Hafeez | 455/63.1 |

OTHER PUBLICATIONS

Carleial, Aydano B., "A Case Where Interference Does Not Reduce Capacity", IEEE Transactions on Information Theory, Sep. 1975, pp. 569-570.

Cendrillon et al., "Optimal Multiuser Spectrum Balancing for Digital Subscriber Lines", IEEE Transactions on Communications, vol. 54, No. 5, May 2006, pp. 922-933.

Cioffi, Chapter 1 of course book for EE379A; Digital Communications—Signal Processing, available at http://stanford.edu/group/cioffi/, downloaded on Jun. 11, 2010.

(Continued)

*Primary Examiner* — Phuong Phu

(57) ABSTRACT

Techniques are provided for detecting a coded signal in the presence of non-Gaussian interference. In an embodiment, a primary transmitter corresponds to a desired transmitter, and one or more secondary transmitters correspond to interfering transmitters. In an embodiment, received symbols, which include non-Gaussian interference and additive noise, are decoded to determine a set of message bits. In an embodiment, an estimate of the set of message bits may be determined using a minimum-distance detector or an optimal-ML detector, for example, depending on the signal-to-noise and/or signal-to-interference ratios at a receiver.

20 Claims, 6 Drawing Sheets

(56) References Cited

OTHER PUBLICATIONS

Etkin et al., "Gaussian Interference Channel Capacity to Within One Bit: the General Case", ISIT2007, Nice, France, Jun. 24-29, 2007, pp. 2181-2185.

Han et al., "A New Achievable Rate Region for the Interference Channel", IEEE Transactions on Information Theory, vol. IT-27, No. 1, Jan. 1981, pp. 49-60.

Lee et al., "Multi-User Discrete Bit-Loading for DMT-based DSL Systems", in Proceedings of IEEE Global Telecommunications Conference (GLOBECOM'02), 2002, pp. 1259-1263.

Rao et al., "The Gaussian Interference Channel at Low SNR", ISIT 2004, Chicago, USA, Jun. 27-Jul. 2, 2004, p. 416.

Sasonl, "On Achievable Rate Regions for the Gaussian Interference Channel", ISIT 2004, Chicago, USA, Jun. 27-Jul. 2, 2004, p. 1.

U.S. Appl. No. 12/468,631, filed May 19, 2009 by Lee et al.

Yu et al., "Distributed Multiuser Power Control for Digital Subscriber Lines", IEEE Journal on Selected Areas in Communications, vol. 20, No. 5, Jun. 2002, pp. 1105-1115.

* cited by examiner

OPTIMAL SYMBOL DETECTION IN THE PRESENCE OF NON-GAUSSIAN INTERFERENCE

CROSS-REFERENCE TO RELATED APPLICATIONS

This application is a continuation of U.S. patent application Ser. No. 12/823,898, filed Jun. 25, 2010 (currently pending), which claims the benefit under 35 U.S.C. §119(e) of U.S. Provisional Application No. 61/223,986, filed Jul. 8, 2009, which are hereby incorporated by reference herein in their entireties.

This application is related to U.S. patent application Ser. No. 12/468,631, which was filed on May 19, 2009, entitled "DETECTOR FOR SINGLE-USER CODED SIGNALS IN THE PRESENCE OF INTERFERENCE," the disclosure of which is hereby incorporated by reference herein in its entirety.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

The disclosed technology relates generally to decreasing the bit- and/or symbol-error rate of wired or wireless communications systems when one or more interfering transmitters (or users) degrade the quality of a received signal. In an embodiment, the disclosed technology relates to detection and decoding techniques for reducing the error rate and/or computational complexity of a wireless communications receiver.

The interference channel, e.g., the K-user interference channel, is one of the most widely used and practically relevant communications channel models. The interference channel may model transmitters and receivers that communicate in the presence of non-Gaussian interference and/or additive non-Gaussian noise.

The interference channel may be used to model a wide variety of deployments of commercial interest. For example, the interference channel may be used to model a cellular system where base stations and mobile stations do not coordinate, or only partially coordinate, their transmissions. Additionally or alternatively, the interference channel may be used to model transmissions and leakage in a digital subscriber line (DSL) modem downlink where no real-time coordination exists among modems or among customer premise equipment.

SUMMARY OF THE DISCLOSURE

Communications systems, techniques, and methods are disclosed for detecting a signal in the presence of non-Gaussian interference. In particular, the present disclosure relates to techniques for decoding a set of message bits from a set of received symbols, where the set of received symbols are transmitted by a primary transmitter and one or more secondary transmitters. In an embodiment, a primary transmitter corresponds to a desired transmitter, and one or more secondary transmitters correspond to interfering transmitters. In an embodiment, a set of received symbols are filtered to produce a set of detected symbols, where each symbol in the set of detected symbols includes non-Gaussian interference and additive noise. In an embodiment, possible transmit vectors are determined using a first encoding set and one or more secondary encoding sets. In an embodiment, a transmit vector is identified that minimizes a cost function representing an interference-aware detector, and a set of message bits is decoded using constituent elements of the determined transmit vector.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1A:
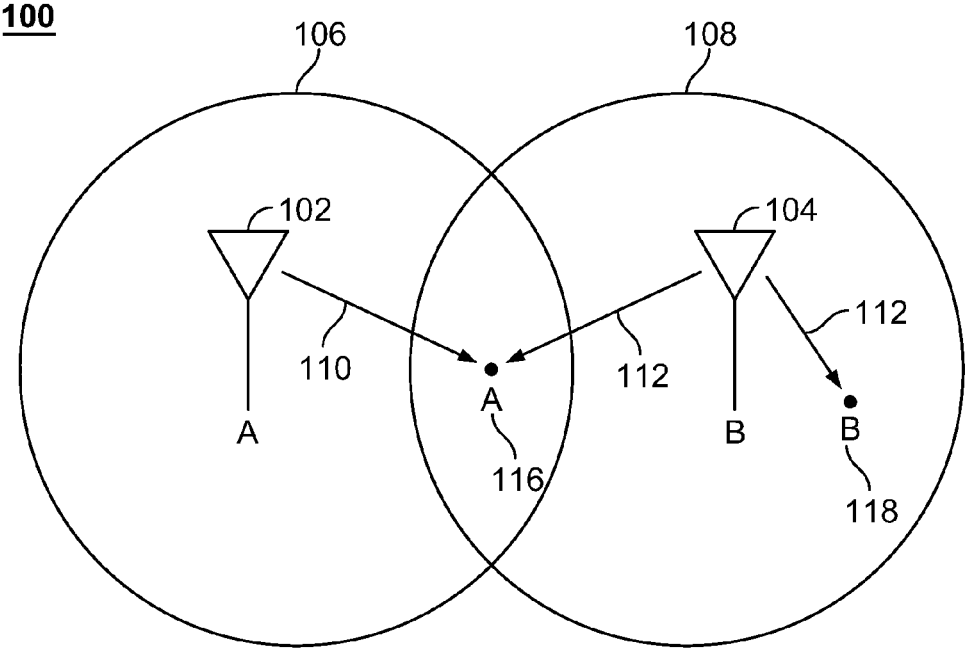
FIGS. 1A and 1B show illustrative wireless and wired interference channel models, respectively.

FIG. 1A shows an illustrative wireless interference channel model in accordance with an embodiment. Wireless communications system 100 may represent a cellular communications system that has multiple users and that generates interference due to, for example, simultaneous transmissions by at least two users. Communications system 100 may employ the disclosed minimum-distance detector or optimal ML-detector in accordance with an embodiment.

Communications system 100 includes base station A 102 and mobile user A 116. Base station A 102 corresponds to, for example, a cellular base station or tower, and transmits desired signal 110 to mobile user A 116. Desired signal 110 corresponds to, for example, a Global System for Mobile communications (GSM) signal, Code-Division Multiple Access (CDMA) signal, Long-Term Evolution (LTE) signal, WiMAX signal, and/or any other suitable wireless signal. Desired signal 110 may attenuate with distance from base station A 102 and therefore may have a limited (or "effective") communications range. For example, desired signal 110 may radiate an effective power only within communications radius 106, which may be a circular or non-circular pattern. Mobile user A 116, located within communications radius A 106, may successfully receive desired signal 110, along with noise and/or interference.

Mobile user A 116 may receive interference from transmissions intended for another user in communications system 100, e.g., mobile user B 118. For example, communications system 100 may include a second base station, e.g., base station B 104, which transmits signal 112 intended for mobile user B 118 (but not for mobile user A 102). Signal 112 may have an effective power within a certain communications radius, such as communications radius 108. Mobile user A 116, also located within communications radius 108, may therefore receive signal 112, which may be regarded as an interference signal by the detection and decoding hardware and processes of mobile user A 116. Such interference received by mobile user A 116 may generally degrade the quality of the overall signal (for example, the overall signal may include desired signal 110, signal 112, and additive noise terms), and may lead to diminished decoding performance. For example, interference may increase the decoding bit- or symbol-error rate (SER), and/or may diminish the quality, and/or increase the latency of an application being transmitted by base station A 102 to mobile user A 116. Therefore, there exists a need for a novel decoder to detect and decode the interference signal 112 during the detection and/or decoding process employed at mobile user A 116.

Figure 1B:
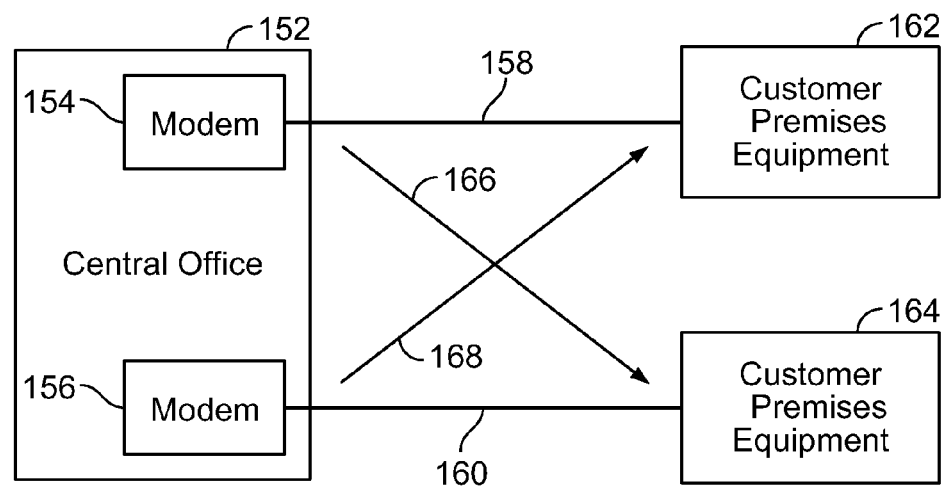

FIG. 1B shows an illustrative wired interference channel model in accordance with an embodiment. Wired communications system 150 may represent a digital subscriber line (DSL) system that has multiple users and that generates interference due to, for example, high-frequency cross-talk between transmission lines or cables. Communications system 150 may employ the disclosed interference-aware hard-decision receiver in accordance with an embodiment.

Communications system 150 originates data transmission at central office 152. Central office 152 corresponds to, for example, a central hub of a telephone network and/or to a data center of an internet and telephone service provider. Central office 152 includes one or more modems for transmitting information to users. For example, central office 150 may include twenty-five, fifty, or any other suitable number of modems for transmitting information to multiple downstream users. For example, Modem 154 and modem 156 represent two such modems in accordance with an embodiment.

The modems used by central office 152, for example, modem 154 and modem 156, each include a bundled pair of transmission lines. For example, modem 154 includes bundled pair 158 for transmission to customer premises equipment 162, and modem 156 includes bundled pair 160 for transmission to customer premises equipment 164. Customer premises equipment 162 and 164 each correspond to a terminal, physically located on or near the premises of one or more users. The term customer premises equipment may also be known as customer-provided equipment.

The signal received at customer premises equipment 162 (or alternatively, customer premises equipment 164) may include cross-talk interference. For example, leakage may occur between bundled pair 158 and 160, and thus cross-talk interference 168 from bundled pair 160 may be introduced into the signal received at customer premises equipment 162. Similarly, cross-talk interference 166 from bundled pair 158 may be introduced into the signal received at customer premises equipment 164. Interference received by customer premises equipment 162 may generally degrade the quality of the overall signal transmitted on bundled pair 158, and may lead to diminished decoding performance at customer premises equipment 162. For example, interference may increase the decoding bit-error rate (BER) or SER, and/or may diminish the quality, and increase the latency, of an application being transmitted by modem 154 to customer premises equipment 162. Further, modems 154 and 156 may be incapable of cooperation, and similarly, customer premises equipment 162 and 164 may be incapable of cooperation. Therefore, there exists a need for a novel decoder to estimate and/or remove the cross-talk interference signal 168 during the detection and/or decoding process employed by customer premises equipment 162.

Figure 2:
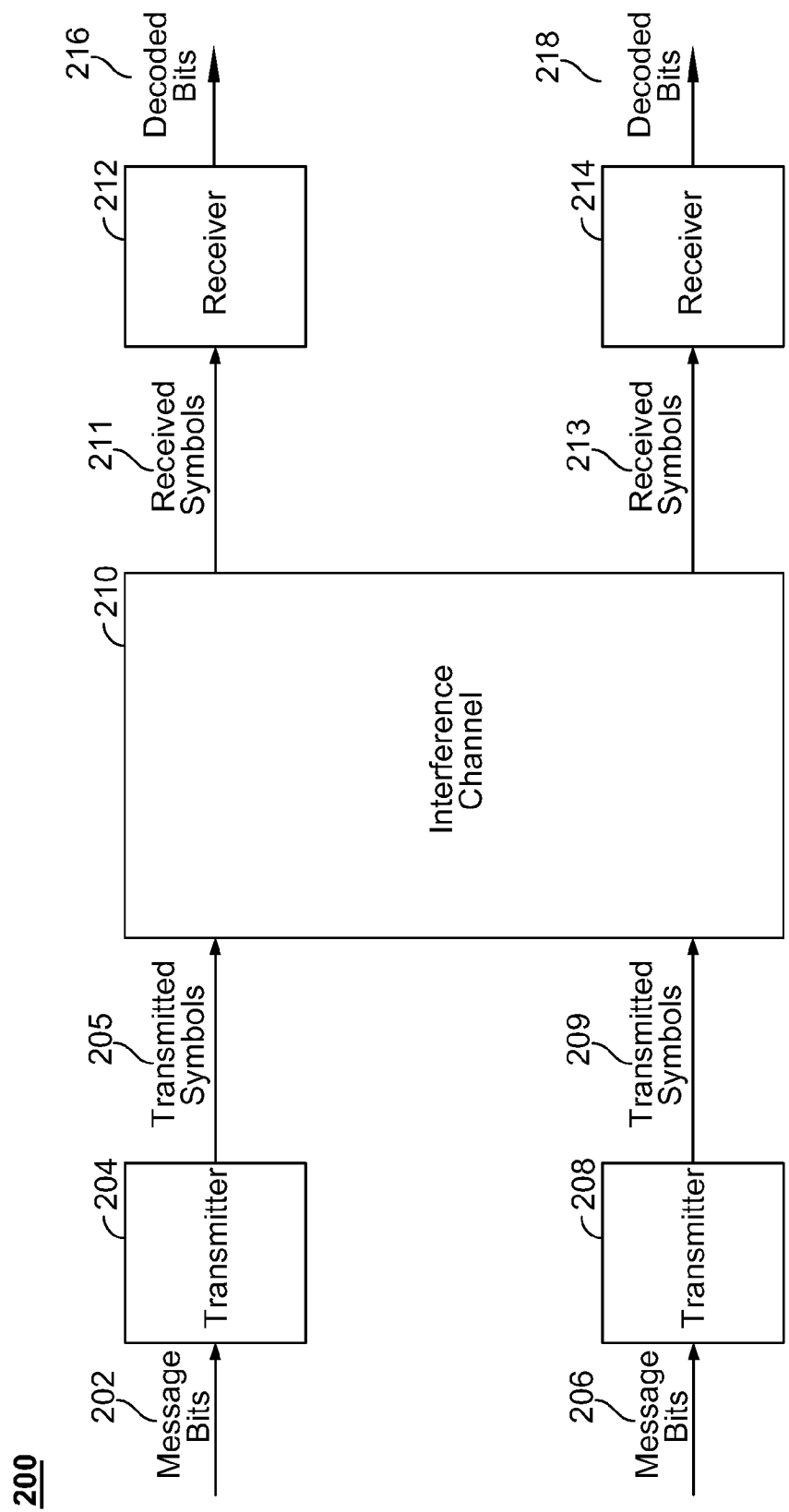
FIG. 2 shows an illustrative model of a communications system for combating channel interference.

FIG. 2 shows an illustrative model of a communications system for combating channel interference. Communications system 200 may be used to model, for example, a wired or wireless communications system in which interference is present, including communications system 100 (FIG. 1A) or 150 (FIG. 1B). As described below, communications system 200 includes two transmitter-receiver pairs. In an embodiment, each of transmitter 204 and 208 transmits a separate stream of information intended for one of receiver 212 or 214. In an embodiment, the information received at receiver 212 may include interference produced by transmitter 208. Similarly, the information receiver 214 may include interference produced by transmitter 204. In an embodiment, the interference received at one receiver, e.g., receiver 212, is a scaled version of the signal transmitted by the unintended transmitter, e.g., transmitter 208.

Communications system 200 produces message bits 202 and 206 to be transmitted to receiver 212 and 214, respectively. Message bits 202 and 206 may correspond to either coded or uncoded data. For example, message bits 202 may correspond to the output of a computer program in a computer application, or may correspond to the output of a voice encoder in a cellular phone application. Message bits 202 (or, alternatively, message bits 206) may be encoded using any suitable encoding technique, such as block-coding, Reed-Solomon coding, and/or Turbo-coding. Further, message bits 202 may be encoded using a similar or different technique than is used to encode message bits 206. For example, message bits 202 may be encoded at a different data transmission rate, with difference symbol timings, and/or with a different modulation than those used to encode message bits 206.

Transmitter 204 may transform message bits 202 into symbols using a signal constellation such as Binary Phase Shift Keying (BPSK), Quadrature Phase Shift Keying (QPSK), Quadrature Amplitude Modulation (QAM), and/or any other suitable signal constellation. The number of signal points in the constellation used by transmitter 204 may be determined based on factors including the desired data transmission rate of communications system 200, and/or the expected operational signal-to-noise ratio (SNR) or signal-to-interference ratio (SIR) at receiver 212. Transmitter 204 may correspond to a wireless transmitter (e.g., base station A 102 of FIG. 1A) or to a wired transmitter (e.g., modem 154 of FIG. 1B). Transmitter 204 produces transmitted symbols 205 for transmission through a channel, for example, interference channel 210. Transmitter 208 may operate using techniques similar or identical to those described above for transmitter 204. For example, transmitter 208 may transform message bits 206 into symbols using a signal constellation as described above for transmitter 204, and transmitter 208 may produce transmitted symbols 209 for transmission through, for example, interference channel 210.

Transmitted symbols 205 and 209 are transmitted through interference channel 210 to receivers 212 and 214, respectively. Interference channel 210 may generally couple or otherwise introduce interference between transmitted symbols 205 and transmitted symbols 209, so that received symbols 211 may contain artifacts of transmitted symbols 209. Similarly, received symbols 213 may contain artifacts of transmitted symbols 205. In an embodiment, received symbols 211 may contain a scaled (i.e., attenuated) version of transmitted symbols 209, or a non-linearly distorted version of transmitted symbols 209. Received symbols 211 may alternatively or additionally contain a delayed or offset version of transmitted symbols 209. In addition to coupling, interference channel 210 may introduce noise, such as additive white Gaussian noise (AWGN) of a certain power to received symbols 211 and/or 213. Received symbols 211 are received by receiver 212. Receiver 212 may use a detector and decoder (not shown) to produce an estimate of message bits 202, which may be referred to as decoded bits 216. Similarly, received symbols 213 are received by receiver 214, which may produce decoded bits 218 as an estimate of message bits 206.

Figure 3:
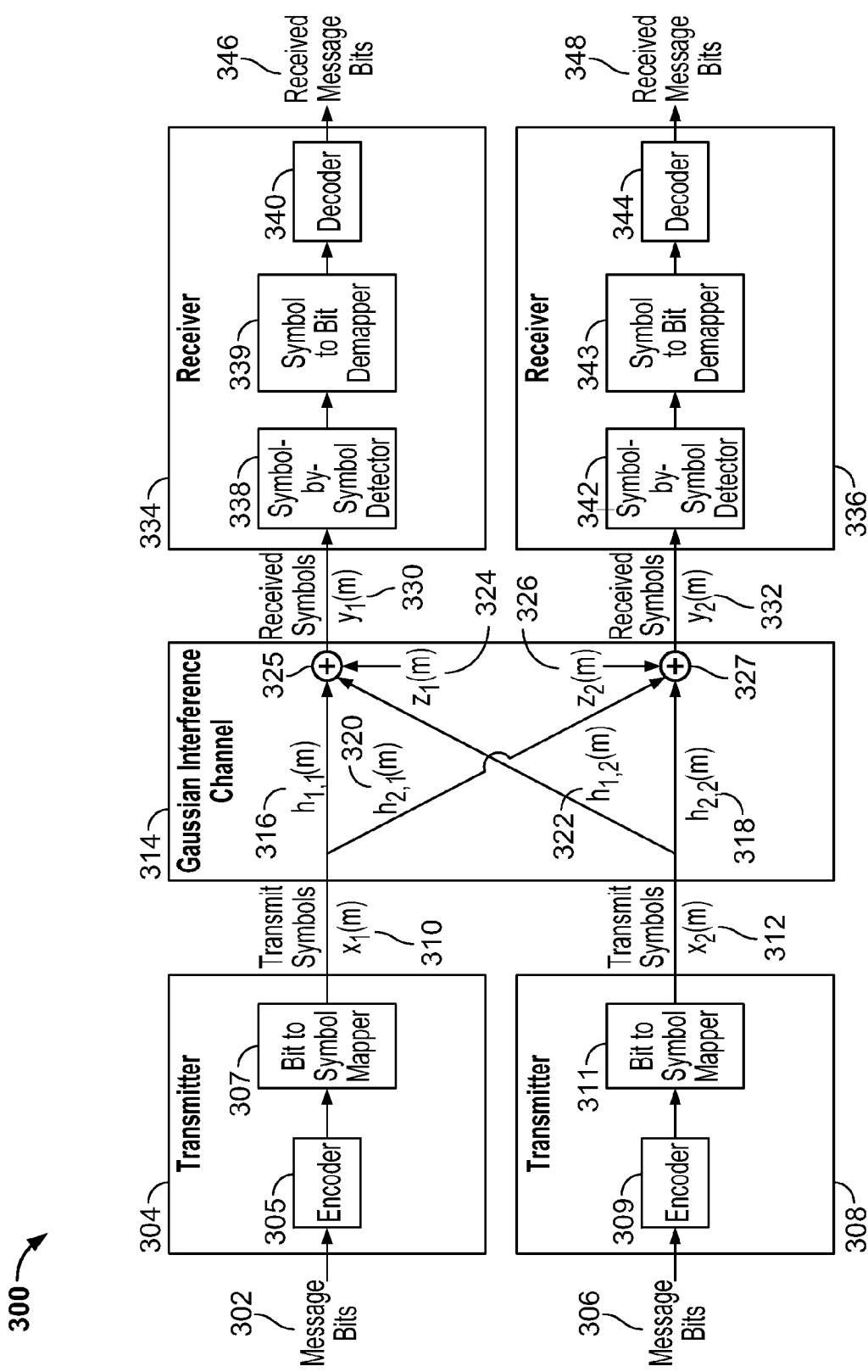
FIG. 3 shows an illustrative model of a two-user interference channel where the interference may be characterized as non-Gaussian.

FIG. 3 shows an illustrative model of a interference channel where the interference may be modeled as non-Gaussian. Communications system 300 may be a further embodiment of communications system 200 (FIG. 2) for the particular case of two users. Communications system 300 may represent a scenario where an interference signal received at a first receiver is a scaled version of a signal transmitted by a second transmitter, and where the scale value is time-variant. In an embodiment, communications system 300 may model a two-user Gaussian interference channel, where each receiver receives an intended signal from a intended transmitter and interference signal from an interfering transmitter in the presence of background AWGN.

In communications system 300, message bits 302 and 306 may be similar or identical to message bits 202 and 206, respectively (both of FIG. 2). Similarly, transmitter 304 and 308 may be similar to identical to transmitter 204 and 208, respectively (both of FIG. 2). In an embodiment, transmitters 304 and 308 encode message bits 302 and 306 with encoders 305 and 309, respectively. For example, encoder 305 may encode message bits 302 using (k,n) block coding, turbo-coding, convolution coding, or any other suitable coding strategy. Similarly, encoder 309 may encode message bits 306 with any suitable coding strategy.

In an embodiment, the output of encoder 305 may be input to bit-to-symbol mapper 307. Bit-to-symbol mapper 307 may convert, transform, or otherwise group the output of encoder 305 into symbols for transmission over a communications channel. For example, bit-to-symbol mapper 307 may use BPSK or a higher-order phase shift keying modulation, QAM, and/or pulse-amplitude modulation (PAM) modulation to convert, transform, or otherwise group the output of encoder 305 into transmit symbols 310, where transmit symbols 310 are intended for transmission over a communications channel similar or identical to Gaussian interference channel 314. Similarly, bit-to-symbol mapper 311 may convert, transform, or otherwise group the output of encoder 309 into transmit symbols 312, where transmit symbols 312 are intended for transmission over a communications channel similar or identical to Gaussian interference channel 314.

In an embodiment, transmitter 304 corresponds to, or belongs to, a different entity than transmitter 308 and does not communicate or cooperate with transmitter 308. In an embodiment, transmitter 304 may correspond to a first base station, for example, base station A 102 (FIG. 1A), and transmitter 308 may correspond to a second base station, for example, base station B 104 (FIG. 1B). Correspondingly, encoders 305 and 309 may employ different modulations. For example, in an embodiment, encoder 305 uses BPSK to encode message bits 302, and encoder 309 uses QAM to encode message bits 306. In addition, transmitter 304 may not coordinate or be aware of the modulation, symbol-timings, and/or any other parameters of transmitter 308. Similarly, transmitter 308 may not coordinate or be aware of the modulation, symbol-timings, and/or any other parameters of transmitter 304.

In an embodiment, Gaussian interference channel 314 may be a further embodiment of interference channel 210 (FIG. 2), and may correspond to a two-user Gaussian interference channel. In an embodiment, received symbols 330 and 332 may be represented using the following mathematical equations:

$$y_1(m) = h_{1,1}(m)x_1(m) + h_{1,2}(m)x_2(m) + z_1(m), \quad (1)$$

$$y_2(m) = h_{2,2}(m)x_2(m) + h_{2,1}(m)x_1(m) + z_2(m), \quad (2)$$

where $y_1(m)$ and $y_2(m)$ denote received symbols 330 and 332, respectively, at time m, $h_{1,1}(m)$ and $h_{2,2}(m)$ denote channel state information 316 and 318, respectively (for example, the fading state, from transmitter 304 to receiver 334, and transmitter 308 to receiver 336 at time m, respectively), and $x_1(m)$ and $x_2(m)$ denote transmit symbols 310 and transmit symbols 312 at time m, respectively. Further, in equations (1) and (2), above, $h_{1,2}(m)$ (labeled 322 in FIG. 3) and $h_{2,1}(m)$ (labeled 320 in FIG. 3) denote the channel state of the interference channel between the first transmission stream (i.e., between transmitter 304 and receiver 334) and the second transmission stream (i.e., between transmitter 308 and receiver 336) in accordance with an embodiment. In particular, $h_{1,2}(m)$ denotes the scalar or vector value of the interference channel received at receiver 334, and $h_{2,1}(m)$ denotes the scalar or vector value of the interference channel received at receiver 336, at time m. In equations (1) and (2), above, $z_1(m)$ (labeled 324 in FIG. 3) and $z_2(m)$ (labeled 326 in FIG. 3) denote additive noise at time m at receiver 334 and receiver 336, respectively. For example, in an embodiment, $z_1(m)$ and $z_2(m)$ denote independent sequences of uncorrelated AWGN. The index m is used to represent time for clarity of the presentation. Alternatively, the index m can be used to represent frequency, spatial position, and/or any other suitable dimension.

Receivers 334 and 336 may correspond to further embodiments of receivers 212 and 214 (both of FIG. 2). In an embodiment, receiver 334 and/or 336 may be designed based on the maximum-likelihood (ML) principle, in which each receiver may implement circuitry and/or signal processing algorithms to perform an exhaustive search of all received symbols. However, the computational complexity of this approach may be large and may generally increase exponentially with codeword length, e.g., of message bits 302 (i.e., in the case that message bits 302 are encoded).

Alternatively, receiver 334 and 336 may be designed using a lower complexity technique. Such a technique may be advantageous in decreasing decoding time, power consumption, and/or the monetary cost of a receiver. In an embodiment, receiver 334 and/or 336 are constrained to include a symbol-by-symbol (or "symbol-wise") detector followed by an independent decoder. For example, in an embodiment, receiver 334 uses symbol-by-symbol detector 338, symbol-to-bit demapper 339, and decoder 340 to mitigate the effect of interference in received symbols 330 to produce received message bits 346. Similarly, in an embodiment, receiver 332 uses symbol-by-symbol detector 342, symbol-to-bit demapper 343, and decoder 344 to mitigate the effect of interference in received symbols 332 to produce received message bits 348. Such an approach to the design of receivers 334 and 336 may advantageously lower the computational complexity of the decoding process, and also simplify system design by allowing for independent optimization of a detector (e.g., symbol-by-symbol detector 338) and decoder (e.g., decoder 340).

In an embodiment, communications system 200 (FIG. 2) and communications system 300 (FIG. 3) depict two-user systems. However, the techniques presented herein readily apply to multi-user Gaussian interference channels when the number of users is greater than two. For example, the techniques described herein apply at least to the K-user Gaussian interference channel when K is an integer greater than or equal to two. The received signal at receiver i for the K-user Gaussian interference channel is given by $$y_i[m] = \sum_{j=1}^{K} h_{i,j}[m] x_j[m] + z_i[m], \quad (3)$$

where $x_j[m]$ is the signal of transmitter j at time m, $h_{i,j}[m]$ is the gain of the channel from transmitter j to receiver i, and $z_i[m]$ is the Gaussian background noise of receiver i. For baseband systems, $z_i[m]$ is assumed to be a real Gaussian random variable with variance $\bar{\sigma}_z^2$, whereas, for passband systems, $z_i[m]$ is circularly symmetric complex Gaussian with variance $\bar{\sigma}_z^2$ on each dimension.

Equation (3) may be used to model various practical systems such as a cellular system or a DSL system. For example, in an embodiment, equation (3) may model the downlink of a cellular system, where a mobile station may decode a signal of a serving base station in the presence of interfering signals from other base stations. In another embodiment, channel model (3) may model the downlink transmission in one cell where a base station employs K antennas to transmit to K users.

If there are more than two users, then a desired user may be represented by a primary transmitter-receiver pair (e.g., transmitter 304 and receiver 334 of FIG. 3), and the interference from all non-primary users is modeled as the sum of the interference produced by the non-primary users (non-primary users are also referred to as secondary users herein, and non-primary transmitters and receivers are also referred to as secondary transmitters and receivers herein, respectively). For example, in FIG. 3, the term $h_{1,2}(m)$ can be used to absorb the interference produced by all non-primary users. In the case of M total users, the symbol-wise joint ML-detector operates by determining the closest point $(x_1, x_2, \ldots, x_M)$ from among the combined constellation points for the M users. The symbol-wise joint ML-detector then selects the user of interest for detection. In the following, the index m will be omitted for brevity.

In an embodiment, communications system 200 (FIG. 2) and/or communications system 300 (FIG. 3) employ a detector for $x_1$ that first divides the received signal $y_1$ by the channel gain $h_{1,1}$, and then maps it to the closest point (in Euclidean distance) of the signal constellation of the transmitter. This detector will be referred to herein as the conventional detector. When interference is present, the conventional detector treats the interference as part of background noise. For example, in equation (3), the interference term $\sum_{j=2}^{K} h_{1,j} x_j$ and the background noise term $z_1$ are considered together as the overall noise level.

The conventional detector is optimal if the interference is Gaussian. For example, in DSL, combined interference from many users can be well-approximated as Gaussian. On the other hand, in many systems, the inference is not Gaussian and is not well-approximated by a Gaussian, and the conventional detector is sub-optimal. In these systems, it may be advantageous for a communications receiver, for example, the communications receiver of communications system 200 (FIG. 2) or communications system 300 (FIG. 3), to use an interference-aware detector that exploits the non-Gaussian statistics of the interference.

In an embodiment, communications system 200 (FIG. 2) and communications system 300 (FIG. 3) use a joint ML-detector, also referred to as a minimum-distance detector, to detect and decode received message bits. For example, a minimum distance detector may be implemented as symbol-by-symbol detector 338 or 342 of communications system 300 (all of FIG. 3) or as part of receiver 212 of 213 of communications system 200 (all of FIG. 2).

In an embodiment, the minimum distance detector forms a joint ML-estimate of $(x_1, x_2, \ldots, x_K)$ given $y_1$, which may be expressed as $$(x_1, x_2, \ldots, x_K)(y_1) = \underset{(x_1, x_2, \ldots, x_K)}{\operatorname{argmax}} f_{Y_1|X_1, X_2, \ldots, X_K}(y_1 | x_1, x_2, \ldots, x_K),$$

where $$f_{Y_1|X_1, X_2, \ldots, X_K}(y_1 | x_1, x_2, \ldots, x_K) =$$

$$f_Z\left(y_1 - \sum_{j=1}^{K} h_{1,j} x_j\right) = \begin{cases} \dfrac{1}{\sqrt{2\pi}\,\bar{\sigma}_z^2} \exp\left(-\dfrac{\left|y_1 - \sum_{j=1}^{K} h_{1,j} x_j\right|^2}{2\bar{\sigma}_z^2}\right) & \text{for baseband} \\[2ex] \dfrac{1}{2\pi\bar{\sigma}_z^2} \exp\left(-\dfrac{\left|y_1 - \sum_{j=1}^{K} h_{1,j} x_j\right|^2}{2\bar{\sigma}_z^2}\right) & \text{for passband} \end{cases}$$

is the conditional probability density function (pdf) of $y_1$ given $(x_1, x_2, \ldots, x_K)$. Thus, in an embodiment, the joint ML-estimate of $(x_1, x_2, \ldots, x_K)$ given $y_1$, which may be expressed $$(\widehat{x_1, x_2, \ldots, x_K})(y_1) = \underset{(x_1, x_2, \ldots, x_k)}{\operatorname{argmin}} \left|y_1 - \sum_{j=1}^{K} h_{1,j} x_j\right|^2$$

for both baseband and passband systems. The desired signal component, $\hat{x}_1(y_1)$, of the joint ML-estimate $$(\widehat{x_1, x_2, \ldots, x_K})(y_1) \text{ is given by } \hat{x}_1(y_1) =$$

$$\underset{x_1}{\operatorname{argmin}}\left(\underset{x_2, \ldots, x_K}{\min} \left|y_1 - \sum_{j=1}^{K} h_{1,j} x_j\right|^2\right).$$

It follows from the proceeding that the detection of $x_1$ can be accomplished as follows. First, a combined received constellation point $\sum_{j=1}^{K} h_{1,j} x_j$ is formed for each K-tuple $(x_1, \ldots, x_K) \in S_1 \times \ldots \times S_K$, where $S_j$ is the constellation of transmitter j, j=1, . . . , K. The new constellation can be denoted as $S_{comb} = \sum_{j=1}^{K} h_{1,j} S_j$. The detector then determines the combined constellation point that is closest to $y_1$ among all the points in $S_{comb}$, and the corresponding $(\hat{x}_1, \ldots, \hat{x}_K)$. Finally, $\hat{x}_1$ from $(\hat{x}_1, \ldots, \hat{x}_K)$ is chosen as the estimate of $x_1$. This detector is named the minimum-distance detector because the estimate of $x_1$ is the point in $S_1$ that corresponds to the combined signal constellation point of $S_{comb}$) that has the minimum distance to the received signal.

In an alternative embodiment, communications system 200 (FIG. 2) and/or communications system 300 (FIG. 3) may use the optimal ML-detector. For example, the optimal ML-detector may be implemented as symbol-by-symbol detector 338 or 342 of communications system 300 (all of FIG. 3) or as part of receiver 212 of 213 of communications system 200 (all of FIG. 2). In an embodiment, the optimal ML-detector minimizes $$P_e \triangleq Pr\{\hat{x}_1(y_1) \neq x_1\} = \sum_{m=0}^{M_1-1} Pr\{x_1 = x_{1,m}\}Pr\{\hat{x}_1(y_1) \neq x_{1,m}|x_1 = x_{1,m}\}.$$

In this embodiment, the ML-estimate of $x_1$ can be rewritten in an equivalent form as $$\hat{x}_1(y_1) = \underset{x_1}{\operatorname{argmax}} f_{Y_1|X_1}(y_1|x_1),$$

where $$f_{Y_1|X_1}(y_1|x_1) = \sum_{m_2=0}^{M_2-1} \cdots \sum_{m_K=0}^{M_K-1} Pr\{X_2 = x_{2,m_2}, \ldots X_K = x_{K,m_K}\} \cdot \quad (4)$$

$$f_z\left(y_1 - h_{1,1}x_1 - \sum_{j=2}^{K} h_{1,j}x_{j,m_j}\right) =$$

$$\frac{1}{M_2 \ldots M_K} \sum_{m_2=0}^{M_2-1} \cdots \sum_{m_K=0}^{M_K-1} \cdot f_z\left(y_1 - h_{1,1}x_1 - \sum_{j=2}^{K} h_{1,j}x_{j,m_j}\right)$$

is the conditional pdf of $Y_1$ given $X_1$. In an embodiment, equation in (4) is implemented for a baseband system, and hence, equation (4) can be expressed $$f_{Y_1|X_1}(y_1|x_1) =$$

$$\frac{1}{\sqrt{2\pi}\,\sigma_z M_2 \cdots M_K} \sum_{m_2=0}^{M_2-1} \cdots \sum_{m_K=0}^{M_K-1} \exp\left(-\frac{\left|y_1 - h_{1,1}x_1 - \sum_{j=2}^{K} h_{1,j}x_{j,m_j}\right|^2}{2\sigma_z^2}\right)$$

In an alternative embodiment, equation in (4) is implemented for a passband system, and hence, equation (4) can be expressed $$f_{Y_1|X_1}(y_1|x_1) =$$

$$\frac{1}{2\pi\overline{\sigma_z^2} M_2 \cdots M_K} \sum_{m_2=0}^{M_2-1} \cdots \sum_{m_K=0}^{M_K-1} \exp\left(-\frac{\left|y_1 - h_{1,1}x_1 - \sum_{j=2}^{K} h_{1,j}x_{j,m_j}\right|^2}{2\overline{\sigma_z^2}}\right)$$

Therefore, in an embodiment, the actual implementation of the optimal ML-detector can be based on $$\hat{x}_1(y_1) = \underset{x_1}{\operatorname{argmax}} \sum_{m_2=0}^{M_2-1} \cdots \sum_{m_K=0}^{M_K-1} \exp\left(-\frac{\left|y_1 - h_{1,1}x_1 - \sum_{j=2}^{K} h_{1,j}x_{j,m_j}\right|^2}{2\overline{\sigma_z^2}}\right)$$

for both baseband and passband systems.

Compared to the minimum-distance detector, the optimal ML-detector may be more computationally complex due to at least (i) the calculation of the sum of exponential functions and (ii) the calculation of the Euclidean distance from the received signal to all combined signal constellation points.

Figure 4A:
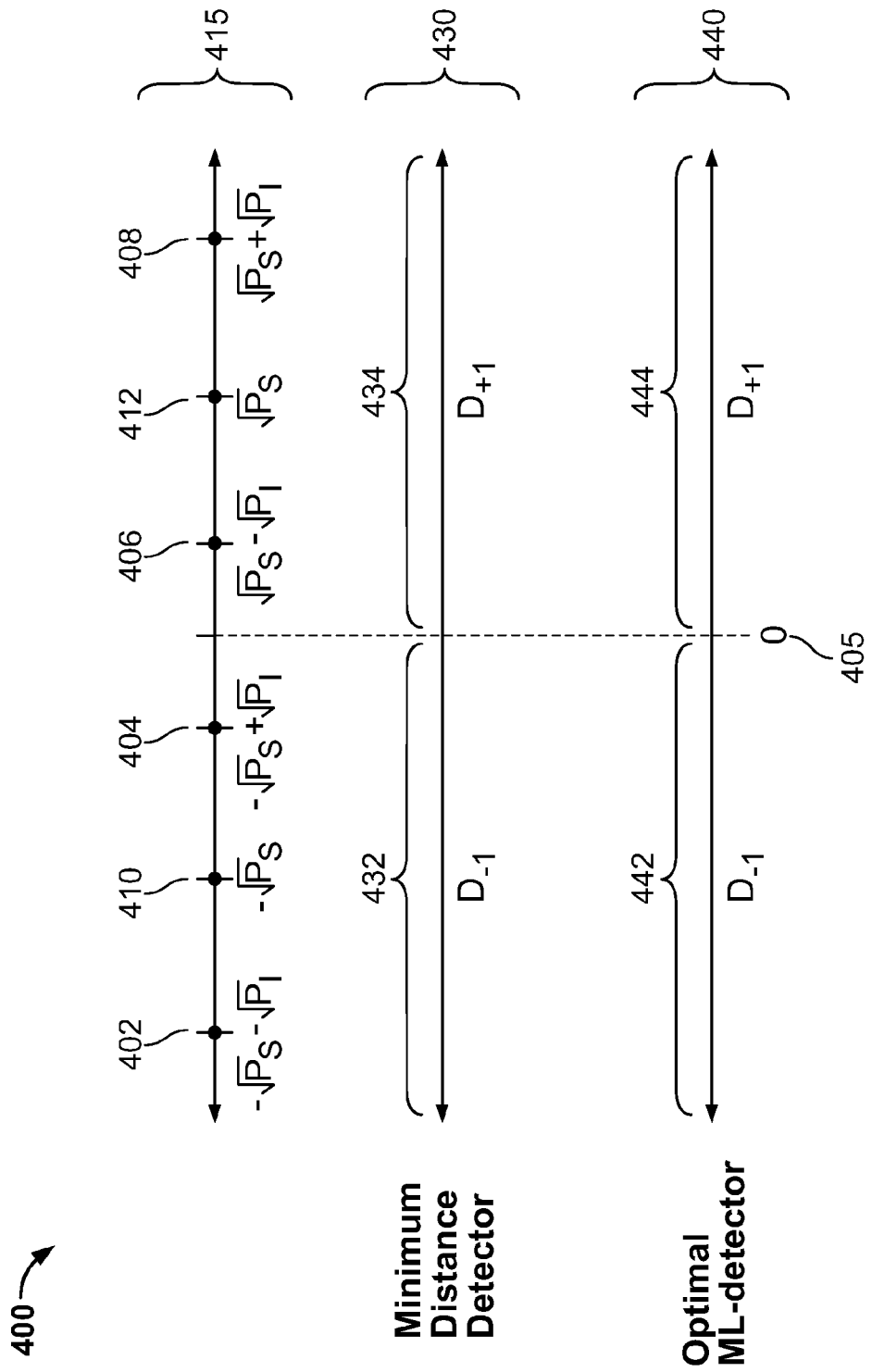
FIGS. 4A and 4B show illustrative decision regions of both a minimum-distance detector and an optimal ML-detector for the cases of relatively weak and relatively strong interference, respectively.

FIG. 4A shows illustrative decision regions of both the proposed minimum-distance detector and the proposed optimal ML-detector for the case of relatively weak interference (in the sense that the average signal power is greater than the average interference power) in accordance with an embodiment. Diagram 400 illustrates the case where an encoder, for example, an encoder similar or identical to encoder 305 or 309 (both of FIG. 3) uses BPSK modulation, and where the interference is weak, that is, where SIR>1. FIG. 4A has been generated for the case where transmitter 304 (FIG. 3) transmits an amplitude value of $\sqrt{P_S}$ for a logical '1' bit and an amplitude value of $-\sqrt{P_S}$ for a logical '−1' bit, where $P_s$ denotes the average receive power per symbol. The interference signal is assumed to have average signal power $P_I$, which is stationary across received symbols. The weak interference assumption further implies that $P_I<P_S$. Further, it is assumed that $z_1(m)$ and $z_2(m)$ are each zero-mean stationary AWGN noise sequences that are independent of each other, each having a non-negative variance.

Plot 415 shows the possible output points of a symbol-by-symbol detector. For example, in an embodiment, plot 415 corresponds to the output of symbol-by-symbol detector 338 or 342 (FIG. 3) ignoring the effects of AWGN in accordance with an embodiment. When a logical '1' is transmitted, for example, by transmitter 304 (FIG. 3), output 412 would be received in the absence of interference and AWGN. The presence of interference may result in either output 406 or output 48 being received. Specifically, if the interferer transmits a logical '1,' then output 408 may be received, and if the interferer transmits a logical '−1,' then output 406 may be received. Similarly, if the intended transmitter, e.g., transmitter 304 (FIG. 3), transmits a logical '−1,' then output 410 may be received in the absence of AWGN and interference. However, in the presence of interference output 402 may be received if the interferer transmits a logical '−1' and output 404 may be received if the interferer transmits a logical '1'. Further, the presence of AWGN and instantaneous (rather than average) interference values means that any point on plot 415 may be received, as the AWGN noise distribution has infinite support.

Plot 430 depicts the decision regions of the minimum-distance detector in accordance with an embodiment. The minimum-distance detector may be implemented, for example, by symbol-by-symbol detector 338 or 342 (both of FIG. 3). As illustrated in plot 430, the minimum-distance detector may assign every positive output point to a logical '1' and every negative (or equivalently, non-positive) output point to logical '−1.' Therefore, the decision regions of the minimum-distance decoder may be based on Euclidean-distance, as shown in plot 430, where if the detector output lies in region 434, covering the positive detector output values, then a '1' is declared, e.g., by decoder 340 (FIG. 3), and if the detector output lies in region 432, covering the negative detector output values, then a '−1' is declared, e.g., by decoder 340 (FIG. 3).

Plot 440 depicts the decision regions of the optimal ML-detector in accordance with an embodiment. For example, the optimal ML-detector may be implemented, for example, by symbol-by-symbol detector 338 or 342 (both of FIG. 3). The decision regions of the optimal ML-detector may be based on Euclidean-distance, as shown in plot 440, where if the detector output lies in region 444, covering the positive detector output values, then a '1' is declared, e.g., by decoder 340

(FIG. 3), and if the detector output lies in region 442, covering the negative detector output values, then a '−1' is declared, e.g., by decoder 340.

Figure 4B:
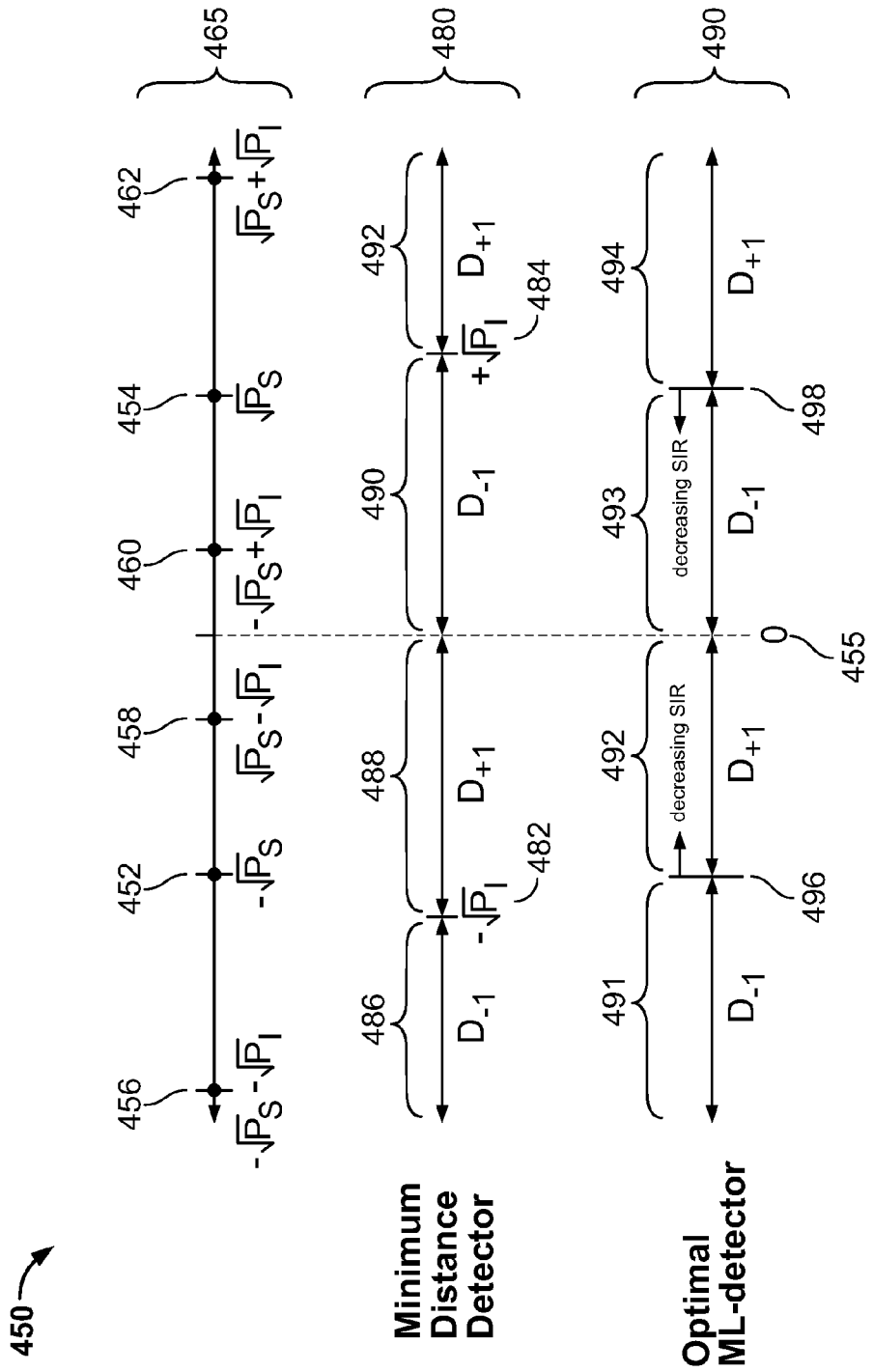

FIG. 4B shows illustrative decision regions of both the proposed minimum-distance detector and the proposed optimal ML-detector for the case of relatively strong interference in accordance with an embodiment. Diagram 450 illustrates the case where an encoder, for example, encoder 305 or 309 (both of FIG. 3) use BPSK modulation, and where the interference is strong (i.e., SIR≤1). FIG. 4B illustrates the case where transmitters 304 and 308 (both of FIG. 3) transmit an amplitude value of $\sqrt{P_S}$ for a logical '1' bit and an amplitude value of $-\sqrt{P_S}$ for a logical '−1' bit, where $P_s$ again denotes the average receive power per symbol. The interference signals are each assumed to have average signal power $P_I$, which is stationary across received symbols, where the strong interference assumption implies that $P_I > P_S$. Further, it is assumed that $z_1(m)$ and $z_2(m)$ are each zero-mean stationary AWGN noise sequences that are independent of each other having a non-negative variance.

Plot 465 shows the possible output points of symbol-by-symbol detector 338 (FIG. 3), symbol-by-symbol detector 342 (FIG. 3), or any other suitable detector, when the effects of AWGN are ignored, in accordance with an embodiment. When a logical '1' is transmitted, for example, by transmitter 304 (FIG. 3), output 454 would be received in the absence of interference and AWGN. However, the presence of interference may result in output 458 or output 462 being received. Specifically, if the interferer (e.g., transmitter 308 may act as an interferer to the transmissions of transmitter 304, as depicted in FIG. 3) transmits a logical '1,' then output 462 may be received, and if the interferer transmits a logical '−1,' then output 458 may be received. Similarly, if the intended transmitter, e.g., transmitter 304 (FIG. 3), transmits a logical '−1,' then output 452 may be received in the absence of AWGN and interference. However, in the presence of interference, output 456 may be received if the interferer transmits a logical '−1' and output 460 may be received if the interferer transmits a logical '1.' Further, the presence of AWGN and instantaneous (rather than average) interference values means that any point on plot 465 may be received, as the AWGN noise distribution has infinite support.

Plot 480 depicts the decision regions of the minimum-distance detector in accordance with an embodiment. Plot 480 includes more than two decision regions. This is because when the statistics of the interference are considered, there are four (rather than two) Gaussian distributions used to determine the decision regions of plot 465. The decision regions of the minimum-distance detector are as shown in plot 480, where if the detector output lies in region 486 or 490, a '−1' is declared, e.g., by decoder 340 (FIG. 3), and if the detector output lies in region 448 or 492, a '1' is declared, e.g., by decoder 340 (FIG. 3). Further, the four Gaussian distributions used to determine the decision regions of plot 445 create two decision threshold lines 482 and 484, which are located at detector output values of $+\sqrt{P_I}$ and $-\sqrt{P_I}$, respectively.

Plot 490 depicts the decision regions of the optimal ML-detector in accordance with an embodiment. Plot 490 includes four decision regions. If the detector output lies in region 491 or 493, a '−1' is declared, e.g., by decoder 340 (FIG. 3), and if the detector output lies in region 492 or 494, a '1' is declared, e.g., by decoder 340 (FIG. 3). Further, the decision threshold lines 496 and 498 are not fixed (as is the case for the minimum-distance detector when SIR≤1), but rather vary continuously with the value of the SIR, when SIR≤1. In particular, decision threshold line 496 moves to the right as the SIR decreases, while decision threshold line 498 moves to the left as the SIR decreases.

Figure 5:
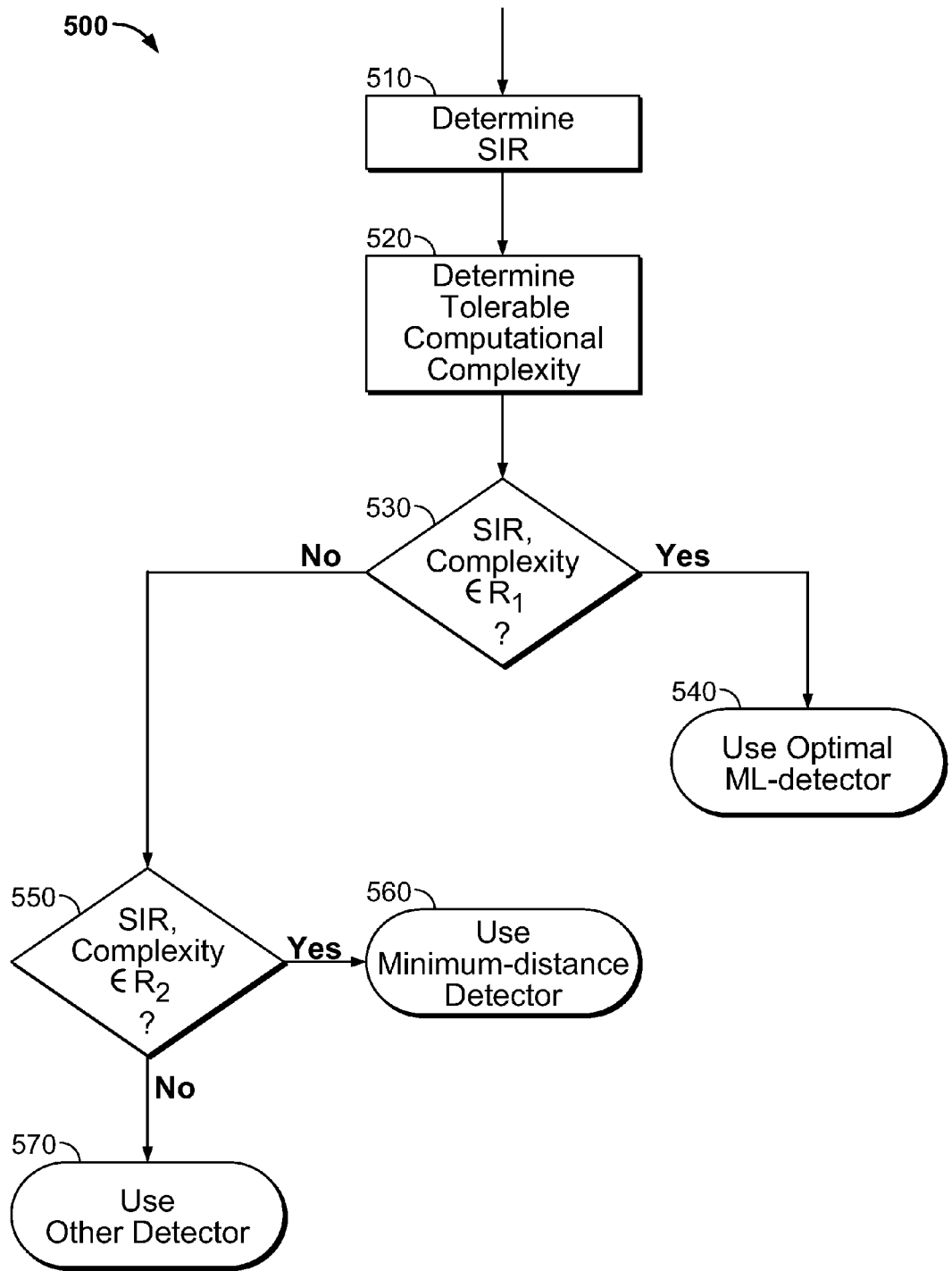
FIG. 5 shows an illustrative process that may be used to decode received symbols using one of a number of possible detectors.

FIG. 5 shows an illustrative process that may be used to decode received symbols using one of a number of possible detectors in accordance with an embodiment. Process 500 may be used, e.g., by symbol-by-symbol detector 338 and/or 342 (both of FIG. 3) to decrease the computational complexity of the decoding process relative to the optimal ML-detector, and may be used, for example, when transmitter 304 and/or 308 (both of FIG. 3) uses BPSK modulation.

At step 510, process 500 determines (for example, obtains or estimates) the SIR of the symbols received at the decoder. For example, in an embodiment, process 500 is used by symbol-by-symbol decoder 338 (FIG. 3). Symbol-by-symbol decoder 338 (FIG. 3) may then measure or estimate the SIR of, for example, received symbols 330 (FIG. 3) by using training data embedded in received symbols 330 (FIG. 3) or by any other suitable technique. For example, in an embodiment symbol-by-symbol decoder 338 (FIG. 3) may measure or estimate the SIR using any suitable detection or estimation technique.

At step 520, process 500 may determine the tolerable computational complexity of a suitable detector to be used by, for example, symbol-by-symbol decoder 338 (FIG. 3), symbol-by-symbol decoder 342 (FIG. 3), or by a detector contained in receiver 212 (FIG. 2) or receiver 214 (FIG. 2). The tolerable computational complexity may correspond to, for example, a maximum tolerable number of floating point operations per second, a required estimated minimum battery lifetime, a maximum tolerable energy usage, or any other relevant factor or combination of these and other factors. In an embodiment, the tolerable computational complexity may be based on the average statistics of the complexity of a decoding algorithm.

At step 530, process 500 may determine if the determined SIR and tolerable computational complexity are within a parameter space $R_1$, which represents the optimal ML-detector. For example, a memory module may contain (SIR, complexity) pairs that characterize the optimal ML-detector, and a check may be performed by process 500 and step 530 to check whether the determined SIR and tolerable computational complexity are within this characterized parameter space, i.e., $R_1$. If the determined SIR and tolerable computational complexity are within $R_1$, then process 500 may proceed to step 540 and implement the optimal ML-detector in the communications receiver. However, if the determined SIR and tolerable computational complexity are not within $R_1$, then process 500 may proceed to step 550 and check whether the determined SIR and tolerable computational complexity are within another parameter space, $R_2$. In an embodiment, parameter space $R_2$ may be disjoint with parameter space $R_1$, while in another embodiment, parameter space $R_2$ may not be disjoint with the parameter space of $R_1$. If the determined SIR and tolerable computational complexity are within $R_2$, then process 500 may proceed to step 560 and implement the minimum-distance detector in the communications receiver. If, on the other hand, the determined SIR and tolerable computational complexity are not within $R_2$, then process 500 may proceed to step 570 and implement a detector other than the minimum-distance detector and the ML-detector. For example, in an embodiment, process 500 may implement the conventional detector, or a successive interference cancellation (SIC) detector at step 570.

The performance of the proposed symbol-wise detectors is now disclosed when 2-PAM is used by both an intended transmitter (e.g., transmitter 204 of FIG. 2) and an interfering transmitter (e.g., transmitter 208 of FIG. 2). Because the optimal ML-detector produces a lower SER than the minimum-distance detector, the SER for the minimum-distance detector is an upper bound on the performance of the optimal ML-detector. Further, the upper bound is tight unless the SNR is relatively small and the power of the interference is slightly larger than the power of the desired signal.

The SER for the desired detectors may be derived, e.g., using the locations of the signal points in plots 415 (FIG. 4A) and 465 (FIG. 4B) using standard communications system analysis. Although exact SER expressions are available for all of the disclosed detectors (except for possibly the optimal ML-detector), the derivations are generally lengthy. Therefore, approximate SER expressions are disclosed herein. The approximate SER expressions are based on the nearest neighbor union bound (NNUB) approach. The derivations are omitted for brevity.

Using the NNUB approach, an approximation to the SER for the conventional detector in an embodiment, may be shown to be $$P_{e,conv} \approx \frac{1}{2} Q(\sqrt{SNR} - \sqrt{INR}) \text{ for } SIR \geq 1, P_{e,conv} \approx \frac{1}{2} - \frac{1}{2} Q(\sqrt{INR} - \sqrt{SNR}), \quad (5)$$

otherwise, where $$Q(x) = \frac{1}{\sqrt{2\pi}} \int_x^\infty e^{-t^2/2} dt$$

is the Q-function and INR is the interference-to-noise ratio (INR may be identical or an appropriately scaled version of the SIR, in an embodiment). In an embodiment, the SER for the SIC detector is $$P_{e,SIC} \approx \begin{cases} \frac{1}{2} Q(\sqrt{SNR} - 2\sqrt{INR}), & SIR \geq 4 \\ \frac{1}{2} - \frac{1}{2} Q(2\sqrt{INR} - \sqrt{SNR}), & \frac{9}{4} \leq SIR < 4 \\ \frac{1}{2} - \frac{1}{2} Q(\sqrt{SNR} - \sqrt{INR}), & 1 \leq SIR < \frac{9}{4} \\ \frac{1}{2} Q(\sqrt{INR} - \sqrt{SNR}), & \frac{1}{4} \leq SIR < 1 \\ Q(\sqrt{SNR}), & SIR < \frac{1}{4}. \end{cases} \quad (6)$$

Further, in an embodiment, the SER for the minimum-distance detector is $$P_{e,MD} \approx \begin{cases} \frac{1}{2} Q(\sqrt{SNR} - \sqrt{INR}), & SIR \geq 1 \\ \frac{1}{2} Q(\sqrt{INR} - \sqrt{SNR}), & \frac{1}{4} \geq SIR < 1 \\ Q(\sqrt{SNR}), & SIR < \frac{1}{4}. \end{cases} \quad (7)$$

As can be seen from equation (7), for SIR<¼ the interference is very strong and its effect on the SER performance of the detector is negligible. This agrees with the information theoretic results for the strong interference channel. Comparing (5) and (7), it can be deduced that, when SIR<1, the minimum-distance detector outperforms the conventional detector whose SER exceeds ¼. From (6) and (7), it can also be seen that, for SIR≥1, the SER of the minimum-distance detector is smaller than the SER of the SIC detector.

Although the SER expressions above have been derived for 2-PAM modulation, the SER for other modulation schemes can be derived in a similar way. It can also be shown that, for the 2-user case, the conventional detector performs as well as the minimum-distance detector when the SIR exceeds a threshold value $SIR_{th,conv}$. On the contrary, when $SIR<SIR_{th,conv}$, the conventional detector exhibits an error floor.

Let $M_1$ and $M_2$ denote the PAM constellation size of user 1 and 2, respectively. The conventional, the SIC, and the minimum-distance detectors may each be implemented by comparing the received symbol with the locations of the boundaries of the decision regions. Thus, the number of comparisons that are required may serve as a measure for the complexity in an embodiment.

In an embodiment, the conventional detector compares the received signal with the decision boundaries between the constellation points of the desired signal. Thus, at most $M_1-1$ comparisons are needed. In an embodiment, the SIC detector compares the received signal first with the boundaries of the decision regions corresponding to the interference signal, which requires at most $M_2-1$ comparisons. Then the interference component is subtracted from the received signal, and the resulting signal is compared with the boundaries corresponding to the desired signal, which requires at most $M_1-1$ comparisons. Thus, the SIC detector requires at most $M_1+M_2-2$ comparisons. In an embodiment, the minimum-distance detector needs to compare the received signal with the decision regions of the points of the combined constellation $S_{comb}$. Thus, the maximum number of comparisons for the minimum-distance detector is equal to $M_1M_2-1$. Finally, in an embodiment, the optimal ML-detector also needs to use all $M_1M_2$ Euclidean distances between the received symbol and the combined constellation points. The complexity of the minimum-distance and the optimal ML-detector can be reduced by considering the strong interferers and approximating the rest as Gaussian.

Although more comparisons may be needed by the minimum-distance detector compared to its conventional and SIC counterparts, this complexity is negligible when compared to the complexity of other parts of the receiver (such as a Viterbi decoder that may follow the detector). Moreover, in some practical implementations it may be possible to reduce the number of comparisons by optimizing the design of a slicer.

Various embodiments of the disclosed are possible without departing from the spirit and scope of the present disclosure. The above specification, examples and data provide a complete description of the manufacture and use of the composition of the invention. For example, the architecture can be implemented using hardware, software, or a combination of both. Since many embodiments of the invention can be made without departing from the spirit and scope of the invention, the invention resides in the claims hereinafter appended.

The invention claimed is:

1. A method for decoding a set of message bits from a set of symbols, the method comprising:
    receiving the set of symbols from at least one transmitter over a communications channel;
    determining a noise ratio associated with the set of received symbols;
    wherein the noise ratio is a ratio of signal power to noise power;
    determining, based at least in part on the set of received symbols and the determined noise ratio, a transmit value based on at least one encoding set used by the at least one transmitter, wherein the transmit value minimizes a cost function to mitigate interference; and
    decoding the set of message bits based at least in part on the determined transmit value.

2. The method of claim 1, wherein the at least one encoding set comprises a first encoding set used by a primary transmitter and at least one secondary encoding set used by at least one secondary transmitter.

3. The method of claim 2, further comprising determining, based on the first encoding set and the at least one secondary encoding set, a set of possible transmit values.

4. The method claim of 2, wherein the first encoding set corresponds to Binary Phase Shift Keying (BPSK).

5. The method claim of 2, wherein the first encoding set and the at least one secondary encoding set correspond to the same modulation type.

6. The method of claim 1, wherein the cost function is used by a minimum-distance detector.

7. The method of claim 1, wherein the cost function is used by an optimal maximum-likelihood (ML) detector.

8. The method of claim 1, wherein the noise ratio is a signal-to-interference ratio (SIR) or a signal-to-noise ratio (SNR).

9. The method of claim 1, wherein the at least one transmitter further comprises a primary transmitter and a secondary transmitter, which operates asynchronously with respect to the primary transmitter.

10. The method of claim 1, wherein if a signal-to-interference ratio is below a threshold, an optimal ML-detector is used to decode the set of message bits.

11. The method of claim 1, wherein if a signal-to-interference ratio is above a threshold, a minimum-distance detector is used to decode the set of message bits.

12. A decoding circuit for decoding a set of message bits from a set of symbols, the decoding circuit comprising:
    receiving circuitry configured to receive the set of symbols from at least one transmitter over a communications channel;
    computation circuitry configured to determine a noise ratio associated with the set of received symbols;
    wherein the noise ratio is a ratio of signal power to noise power;
    optimization circuitry configured to determine, based at least in part on the set of received symbols and the determined noise ratio, a transmit value based on at least one encoding set used by the at least one transmitter, wherein the transmit value minimizes a cost function to mitigate interference; and
    symbol demapping circuitry configured to decode the set of message bits based at least in part on the determined transmit value.

13. The decoding circuit of claim 12, wherein the computation circuitry is further configured to determine, based on a first encoding set used by a primary transmitter and at least one secondary encoding set used by at least one secondary transmitter, a set of possible transmit values.

14. The decoding circuit of claim 12, wherein the cost function is used by a minimum-distance detector or an optimal maximum-likelihood (ML) detector.

15. The decoding circuit of claim 12, wherein the noise ratio is a signal-to-interference ratio (SIR) or a signal-to-noise ratio (SNR).

16. The decoding circuit of claim 12, wherein the at least one transmitter further comprises a primary transmitter and a secondary transmitter, which operates asynchronously with respect to the primary transmitter.

17. The decoding circuit of claim 12, further comprising an optimal ML-detector, wherein if a signal-to-interference ratio is below a threshold, the optimal ML-detector is used to decode the set of message bits.

18. The decoding circuit of claim 12, wherein if a signal-to-interference ratio is above a threshold, a minimum-distance detector is used to decode the set of message bits.

19. The method of claim 1, further comprising:
    in response to determining that the noise ratio satisfies a criterion, selecting one of a plurality of detectors to process the set of message bits.

20. The decoding circuit of claim 12, wherein the circuit is further configured to select one of a plurality of detectors to process the set of message bits in response to determining that the noise ratio satisfies a criterion.

* * * * *